April 23, 1968
E. E. LALONDE
3,379,947
SPEED CONTROLLED WOUND ROTOR MOTOR HAVING CONTROL
CIRCUIT MOUNTED ON ROTOR SHAFT
Filed June 28, 1967
2 Sheets-Sheet 1
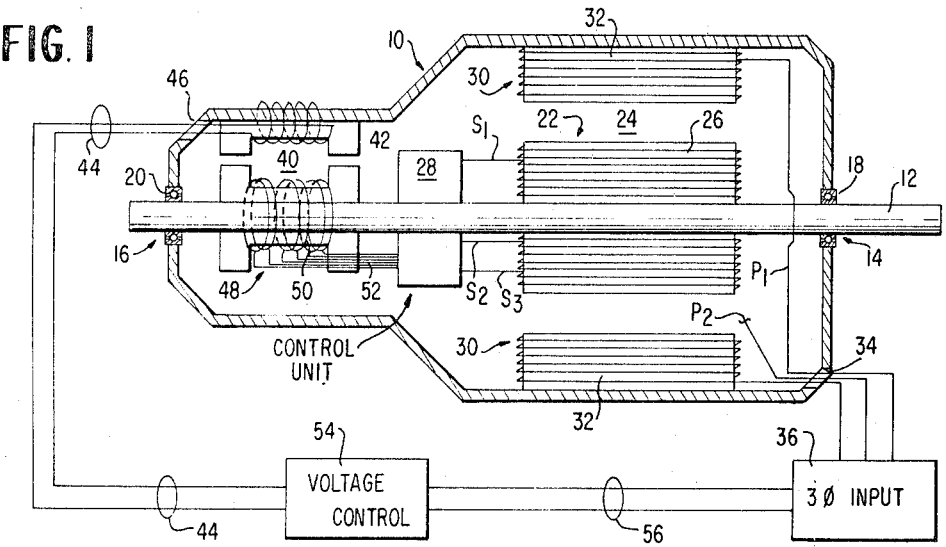
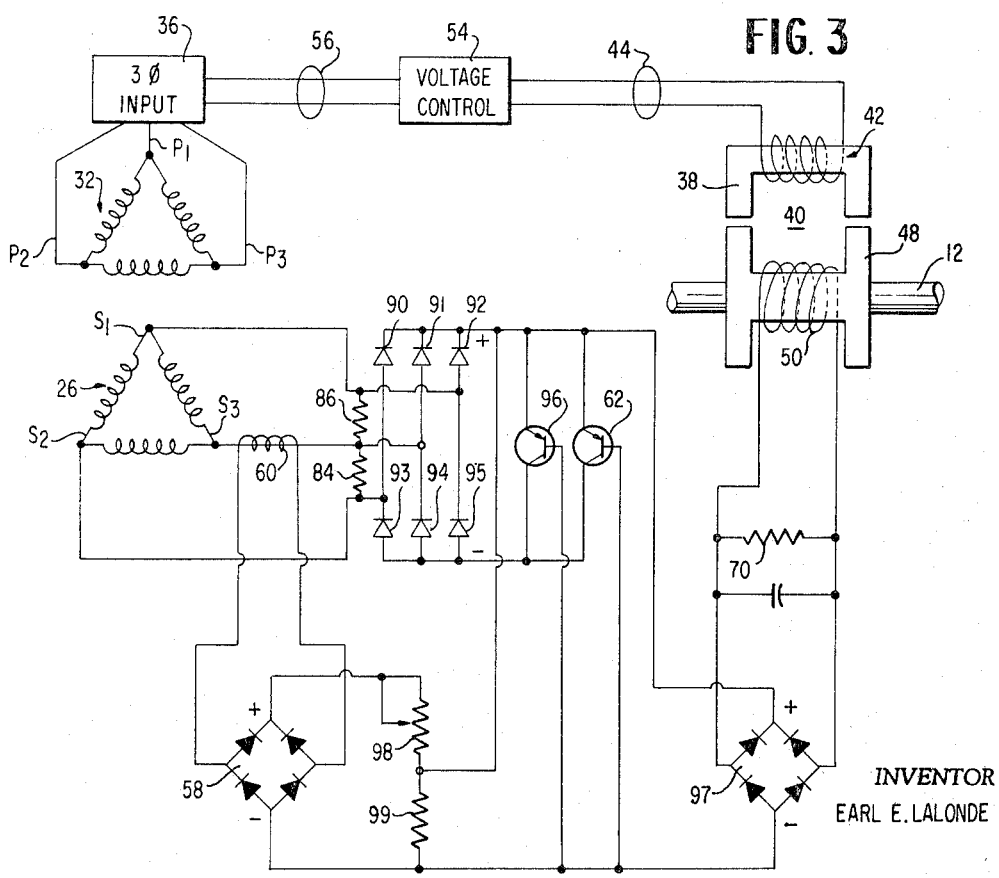
INVENTOR
EARL E. LALONDE
BY Sughrue, Rothwell, Mion, Zinn & Macpeak
ATTORNEYS April 23, 1968     E. E. LALONDE     3,379,947
SPEED CONTROLLED WOUND ROTOR MOTOR HAVING CONTROL
CIRCUIT MOUNTED ON ROTOR SHAFT
Filed June 28, 1967     2 Sheets-Sheet 2

INVENTOR
EARL E. LALONDE

BY Anghros, Rothwell, Mion,
Zinn of Macpeak
ATTORNEYS

United States Patent Office 3,379,947
Patented Apr. 23, 1968

3,379,947
SPEED CONTROLLED WOUND ROTOR MOTOR HAVING CONTROL CIRCUIT MOUNTED ON ROTOR SHAFT
Earl E. Lalonde, 145 W. Sussex Ave.,
Missoula, Mont. 59801
Continuation-in-part of application Ser. No. 398,371,
Sept. 22, 1964. This application June 28, 1967, Ser.
No. 649,630
4 Claims. (Cl. 318—237)

ABSTRACT OF THE DISCLOSURE

A polyphase wound rotor motor which fully eliminates slip rings and their electronic equivalents. The polyphase wound rotor, the secondary of a speed transducer and the electronic control circuit are all mounted on the same rotating shaft. The stator and the primary of the speed transducer are mounted in the motor housing and are inductively coupled to the rotating components. The magnitude of the A.C. applied to the speed transducer controls the impedance across the rotor windings, and booster windings sense current changes in the rotor windings to maintain constant speed despite load variations.

Related Applications

Figure 2:
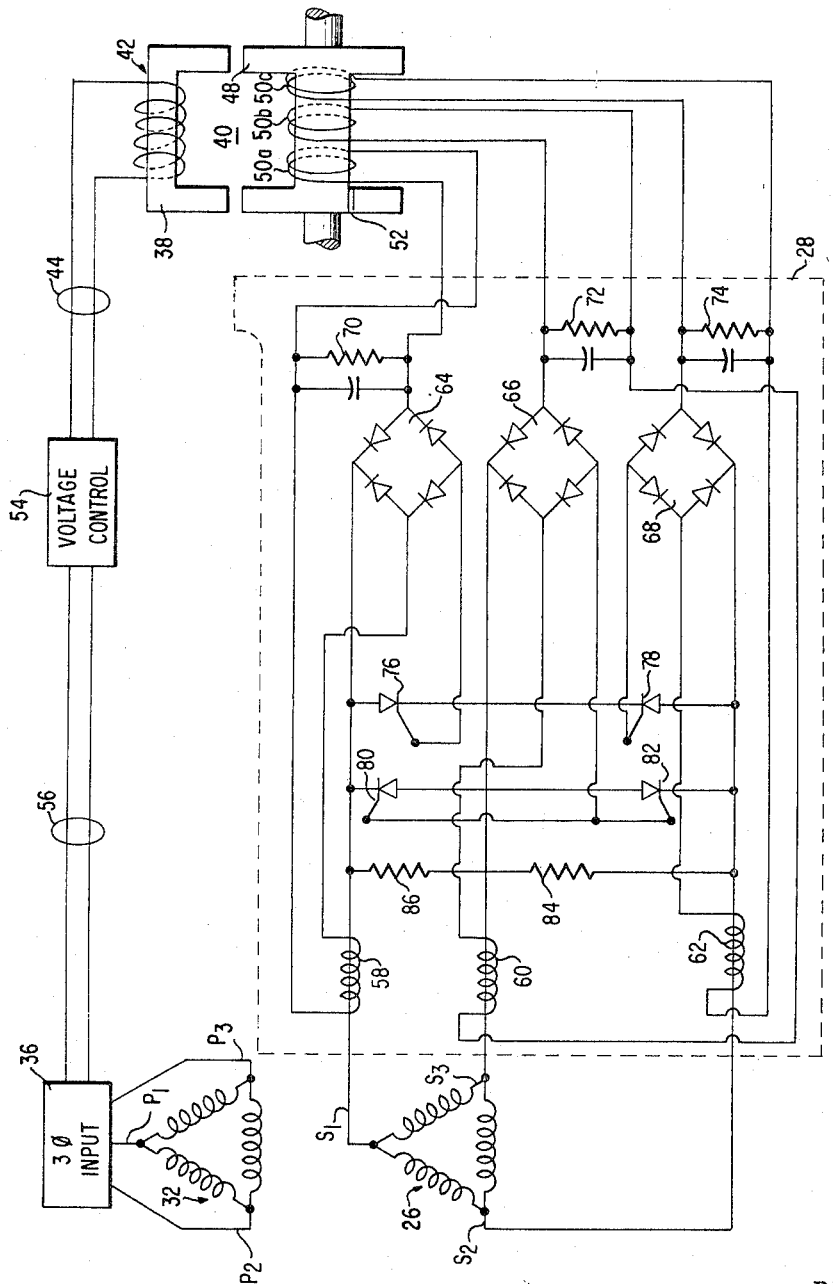

The present application is a continuation-in-part of application No. 398,371 filed on Sept. 22, 1964, now abandoned.

In prior art speed control systems for induction motors wherein the speed is controlled by varying the impedance across the rotor windings, it has been necessary to provide slip rings and brushes to connect the speed controlling circuitry to the rotor windings. The slip rings and brushes add to the bulkiness of the induction motor, and they are also susceptible to wear thus causing increased cost for the motor and for repairs. The present invention alleviates these undesirable features by providing a control circuit which rotates with the rotor. This allows the secondary windings on the rotor to be connected directly to the control circuit without the need for slip rings and brushes.

The polyphase induction motor of the invention is mounted inside a motor housing unit. The rotor is connected to a shaft which extends through the housing unit and rotates with the rotor. The polyphase windings on the rotor of the induction motor are connected directly to a control circuit which is also mounted on the shaft to rotate synchronously with the rotor. A transducer whose stator is attached to the housing unit is supplied with a single-phase AC current. The transducer secondary winding is mounted on a transducer rotor which is inductively coupled to the transducer stator, and the transducer has a three-winding output which is applied to the control unit. The signals supplied by the transducer to the control unit are rectified and applied as gating voltages to a plurality of silicon controlled rectifiers which are connected across the leads from the rotor windings. The amount of time which the silicon controlled rectifiers are rendered conducting depends upon the magnitude of the voltages supplied thereto by the transducer windings. The longer the period of time which they conduct, the lower is the effective impedance across the rotor windings, and the higher the speed of the rotor. Thus, the rotational speed of the rotor may be increased or decreased by increasing or decreasing the magnitude of the signal applied to the transducer stator.

A plurality of booster windings are wound around the leads from the rotor windings to sense the current in the rotor windings. The booster windings are connected to the transducer secondary windings to counteract the input to the full wave rectifiers and maintain the speed of the rotor constant for varying loads.

A better understanding of the invention may be had from the following detailed description when read in connection with the accompanying drawings, wherein:

FIGURE 1 is a preferred embodiment of the invention;
FIGURE 2 is a schematic drawing of the control circuitry; and
FIGURE 3 is a schematic drawing of a variation of the control ciriuitry.

In FIGURES 2 and 3, like reference numerals indicate like components.

A housing unit 10 has a shaft 12 extending through openings 14 and 16 in the housing unit. Bearings 18 and 20 allow shaft 12 to rotate freely. A rotor 22 of polyphase induction motor 24 has a three-phase secondary winding 26 wound thereon. For ease of explanation, the motor is shown as a three-phase induction motor in FIGURES 1 and 2, however, it is understood that the invention is applicable to all polyphase induction motors. The three-phase secondary winding 26 is connected to a control unit 28 by leads S1, S2, and S3, Control unit 28 is mounted on shaft 12 to rotate with the rotor 22. Stator 30 of the three-phase induction motor is attached to housing unit 10 and wound by a three-phase primary winding 32. Three-phase primary winding 32 is connected to a three-phase input source 36 by leads P1, P2, and P3, which are brought out of the housing through opening 34.

A speed transducer 40 comprises a stator 38 and a rotor 48. A single-phase AC winding 42 is wound around the stator and supplied with current from a variac 54 or any other conventional voltage control unit by means of leads 44 which are brought out of the housing unit 10 through opening 46. Three-phase windings 50 shown in FIGURE 2 as separate windings 50a, 50b, and 50c, are wound around rotor 48 of transducer 40. Windings 50 are wound in a spool method to prevent variation in the frequency of the signal induced therein when the transducer rotor rotational speed varies. Output leads 52 from windings 50 are connected to control unit 28 through slot 52. By passing lead 52 through a slot in rotor 48, the leads will not be tangled as the shaft rotates.

Control unit 28 shown in detail in FIGURE 2, contains three booster windings 58, 60, and 62 which are wound to sense the current in leads S1, S2, and S3. The booster windings are connected to the transducer secondary windings 50a, 50b, and 50c. Connected across the transducer secondary windings 50a, 50b, and 50c are parallel resistance capacitance combinations 70, 72, and 74, respectively. The outputs from the connections of the booster windings and the transducer secondary windings are applied respectively to full wave rectifiers 64, 66, and 68. The outputs from the full wave rectifiers 64, 66, and 68 are applied as gating voltages to silicon controlled rectifiers 76, 78, 80, and 82. The magnitude of the inputs to the full wave rectifiers determines the amount of time which the silicon controlled rectifiers will be conducting. The greater the magnitude of the input signal, the greater the amount of time which the silicon controlled rectifiers will conduct, and hence the lower the effective impedance across rotor secondary winding 26. Resistors 84 and 86 are also connected across rotor secondary windings 26 to provide a minimum rotational speed.

Since control unit 28 is mounted on the shaft and rotates with rotor 22 and transducer rotor 48, the connections to control unit 28 from rotor secondary winding 26 and transducer rotor windings 50a, 50b, and 50c, may be made directly without the need of brushes and slip rings.

The operation is as follows:
A three-phase signal, for example 400 volts 60 cycles, is applied by the three-phase input 36 to primary windings 32 via leads P1, P2, and P3. Currents are induced in the three-phase secondary windings 26 which are wound on rotor 22, and cause the rotor to rotate. Leads 56 are connected to tap off a single-phase AC signal from input 36 and apply the signal to a variac or other voltage control unit 54. The voltage unit 54 may be calibrated for speed, and is set to provide a voltage output at 50 or 60 cycles.

The single-phase voltage output from variac 54 is applied to transducer stator winding 42 and induces voltages across transducer secondary windings 50a, 50b, and 50c. The frequency of the signals induced across the transducer secondary windings will be the same as the frequency of the signal applied to the transducer stator winding and will not be affected by a variation in the rotational speed. The outputs from the transducer secondary windings are applied to full wave rectifiers 64, 66, and 68. The full wave rectified signal from the full wave rectifiers 64, 66, and 68 are applied as gating voltage to silicon controlled rectifiers 76, 78, 82, and 80. The silicon controlled rectifiers conduct for a period of time during each cycle which is determined by the magnitude of the gating voltages applied thereto. The silicon controlled rectifiers are in parallel with resistances 84 and 86 and the amount of time which they conduct determines the effective impedance across rotor secondary winding 26. The impedance, for a given load, determines the rotational speed of the rotor.

The booster windings sense the current in leads S1, S2, and S3 and reach a balance with the transducer secondary windings 50a, 50b, and 50c. The combined voltages from the respective booster windings and transducer secondary windings are applied to the full wave rectifiers 64, 66, and 68. The balance maintains the speed of the rotor constant for variation in the load as will be explained hereafter.

Assuming, that the rotor is rotating at a speed which is determined by the setting on variac 54, and that the load on shaft 12 is increased, the control circuit acts to maintain the speed of the rotor constant. As the load on shaft 12 increases, rotor 22 tends to slow down. The slowing down of rotor 22 causes the current in windings S1, S2, and S3 to increase. The increased current through windings S1, S2 and S3 is detected by booster windings, 58, 62, and 60. The increased voltage in the booster windings causes an increase in the total signal applied to the full wave rectifiers and subsequently an increase in the gating voltages applied to the silicon controlled rectifiers 76, 78, 80, and 82. The increased gating voltages lowers the effective impedance across rotor secondary winding 26 and brings the rotor back up to speed.

For a given load, the rotational speed of rotor 22 may be increased by increasing the voltage supplied by variac 54 to transducer 40. The increased transducer voltage causes an increase in conduction times of the silicon controlled rectifiers 76, 78, 80, and 82, thus increasing the speed and causing a decrease in current through windings S1, S2, and S3. The decrease in current through windings S1, S2, and S3 is sensed by the booster windings 58, 60, and 62, and causes a decrease in voltage across the booster windings which is proportional to but less than the increase in the transducer secondary windings 50a, 50b, and 50c. The combined inputs to the full wave rectifiers from the booster windings and the transducer secondary windings reach a balance and the rotor speed is increased.

A modification useful in small motors is shown in FIGURE 3. Only a single phase winding 50 is wound on the secondary of the speed transducer 40 and the output therefrom is connected through a full wave bridge rectifier 97 to control the conduction of a power transistor 62. The single winding 50 requires a six-diode three-phase full wave bridge rectifier, 90–95, whose outputs are connected to the rotor windings 26. An additional power transistor 96, in parallel with power transistor 62, receives the signal from the single booster winding 60 through a full wave bridge rectifier 58 to correct for load variation and maintain constant speed. The voltage divider shown as resistors 98 and 99 allows an adjustment to be made to obtain the exact degree of speed regulation desired. The principle of operation is the same as for the arrangement of FIGURE 2.

While the invention has been described in connection with a present preferred embodiment thereof, it is to be understood that the description is illustrative only and is not intended to limit the invention, the scope of which is defined by the appended claims.

What is claimed is:

1. A speed control system for a polyphase wound rotor motor having a stator connected to a housing unit and a rotor connected to a rotatable shaft comprising;
    (a) a transducer having an output and including a stator wound with a transducer primary winding and a rotatable member wound with a transducer secondary polyphase winding, said transducer rotatable member being mounted on said shaft and said secondary polyphase winding providing the output of said transducer;
    (b) a control unit mounted on said shaft and including means for varying the effective impedance across the rotor windings of the wound rotor motor;
    (c) said transducer output being connected to said control unit for applying a voltage to control said means for varying, and means connected to said control unit for applying a voltage to oppose said transducer voltage and maintain said motor speed at a desired value regardless of load;
    (d) said means for varying comprising
        (i) a polyphase arrangement of silica controlled rectifiers connected across the terminals of the rotor windings,
        (ii) a polyphase arrangement of full wave bridge rectifiers having inputs and outputs, said bridge outputs being connected to said silicon controlled rectifiers and said inputs being connected to said transducer output and said means for applying a voltage, and
        (iii) resistors connected across the terminals of the rotor windings, and
    (e) said means for applying a voltage to oppose comprises a plurality of booster windings, one for each full wave rectifier, inductively coupled to said polyphase rotor windings.

2. A speed control system for a polyphase wound rotor motor having a stator connected to a housing unit and a rotor connected to a rotatable shaft comprising; a transducer having an output and including a stator wound with a transducer primary winding and a rotatable member wound with a transducer secondary polyphase winding, said transducer rotatable member being mounted on said shaft and said secondary polyphase winding providing the output of said transducer; a control unit mounted on said shaft and including means for varying the effective impedance across the rotor windings of the wound rotor motor; said transducer output being connected to said control unit for applying a voltage to control said means for varying, and means connected to said control unit for applying a voltage to oppose said transducer voltage and maintain said motor speed at a desired value regardless of load, wherein said means for varying comprises;
    (a) resistors connected across the windings of the rotor;
    (b) a polyphase full wave bridge rectifier, having its outputs connected across the windings of the rotor;
    (c) a first power transistor having its collector-emitter path connected to the input of said polyphase rectifier; and
    (d) a rectifier having its input connected to the transducer secondary and its output connected to the control terminals of said first transistor.

3. A motor as claimed in claim 2 wherein said transducer secondary winding is a single phase winding.

4. A motor as claimed in claim 3 wherein said means for applying a voltage to oppose comprises a booster winding inductively coupled to sense the current variations in said rotor windings, a second power transistor in parallel with said first transistor and means for controlling the conduction of said second transistor in accordance with the voltage developed across said booster winding.

References Cited

UNITED STATES PATENTS

| | | | |
|---|---|---|---|
| 2,501,361 | 3/1950 | Taylor | 318—237 |
| 3,100,279 | 8/1963 | Rohner | 318—167 |
| 3,227,937 | 1/1966 | Koppelmann et al. | 318—237 |
| 3,327,189 | 6/1967 | Hedstrom | 318—237 XR |

ORIS L. RADER, *Primary Examiner.*

G. RUBINSON, *Assistant Examiner.*